O. LINDEMANN.

Fountain-Cup for Animal-Cage.

No. 8,219. Reissued May 7, 1878.

Witnesses.
Otto Stufeland.
Hugo Bruggemann

Inventor
Otto Lindemann.
by
Van Santvoord & Hauff
his att'ys

N. PETERS, PHOTO-LITHOGRAPHER, WASHINGTON, D. C.

UNITED STATES PATENT OFFICE.

OTTO LINDEMANN, OF EDGEWATER, NEW YORK.

IMPROVEMENT IN FOUNTAIN-CUPS FOR ANIMAL-CAGES.

Specification forming part of Letters Patent No. 196,684, dated October 30, 1877; Reissue No. 8,018, dated December 25, 1877; Reissue No. 8,219, dated May 7, 1878; application filed April 3, 1878.

*To all whom it may concern:*

Be it known that I, OTTO LINDEMANN, of Edgewater, in the county of Richmond, in the State of New York, have invented a new and useful Improvement in Feed and Water Cups for Animal-Cages, which improvement is fully set forth in the following specification, reference being had to the accompanying drawing, in which—

Figure 1:
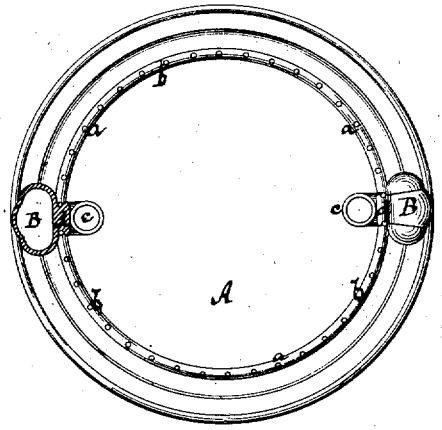
Figure 3:
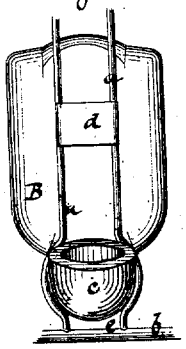
Figure 4:
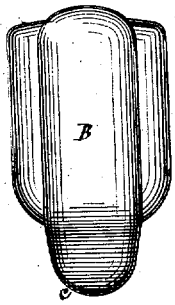
Figure 2:
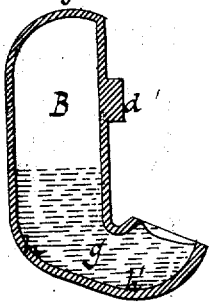

Figure 1 represents a horizontal section of a bird-cage provided with my feed and water cups. Fig. 2 is a vertical section of one of the cups. Fig. 3 is an inside view of the same when secured in position between the filling-wires of a cage. Fig. 4 is a front view of the same.

Similar letters indicate corresponding parts.

This invention consists in a fountain-cup for bird-cages, said cup being closed at the top, and provided with a discharge-opening in one side, near its bottom, and with a spout which communicates with, and the mouth of which is on a level, or nearly so, with, the upper edge of said discharge-opening, all being made in one piece, and provided with means for connecting it with the body of the cage.

The bottom line of the cup is inclined, and forms a continuation of the bottom line of the inner portion of the spout, so that, if the cup is filled with water or seed, such water or seed passes to the spout, where it can be conveniently reached by the bird, and by the inclined portions of the bottom of the cup and of the spout the seed is caused to roll down to and fill the spout as freely as the water, and the bird is enabled to consume gradually all the seed in the cup. On the inner surface of the cup is formed a lug, which is adapted to engage with the filling-wires of the cage, so as to retain the cup in position. The spout cooperates with this retaining-lug for securing and supporting the feed or water cup upon the filling-wires of the cage.

In the drawings, the letter A designates a cage which is constructed of the filling-wires *a a* and cross-bands *b*, in any suitable manner. The feed and water cups B are preferably made of glass; but any other suitable material may be used in their manufacture. The cups, as shown in the drawings, are closed at the top, and each is provided with a discharge-opening at its inner side, near its bottom. This discharge-opening leads into a curved spout, *c*, the mouth of which is on a level, or nearly so, with the upper edge of the discharge-opening *g*. The bottom line of the cup and of the inner portion of the spout forms an incline, *h h'*, as shown in Fig. 2 of the drawings. The cup is charged with seed or water through the spout *c*, being held for that purpose in a downwardly-inclined partly-inverted position, and after it has been filled it is attached to the cage in the position shown in Figs. 1 and 2. The seed or water contained in the cup rises in the spout to a level with the upper edge of the discharge-opening *g*, or nearly so, and, as the bird in the cage consumes the seed or water in the spout, a fresh supply descends from the body of the cup. In using my cup for seed or for water, I construct it with the incline *h h'* at its bottom, so that the seed can roll down the spout, and is not liable to clog up the discharge-opening *g*, and by these means the bird is enabled to consume the seed in the cup to the last grain.

The cup B is provided with a lug, *d*, which projects from its inner surface, and is adapted to engage with the wires of the cage and retain the cup in position on said cage. The lug is dovetailed or undercut, and it is of such a width that it can be passed between two adjacent filling-wires only by springing these wires apart. After the lug has been forced through between the two adjacent filling-wires, these wires, in seeking to recover their original position, engage with the dovetailed or undercut sides of the lug, and prevent the same from passing out of the gripe spontaneously. The cup B is provided with a spout, as shown in the drawings, and the filling-wires of the cage, between which said cup is to be inserted, are curved outward to form an aperture, *e*, through which the spout of the cup can pass freely, and when the spout has been passed through this aperture, and the lug *d* is forced through between the same pair of filling-wires, the cup is securely retained in position, and is supported by portions of the filling-wires which curve under its spout. In order to remove the cup, the filling-wires have to be forced apart, so as to release the lug.

What I claim as new, and desire to secure by Letters Patent, is—

1. A fountain-cup for a bird-cage, the body of said cup being closed at the top and provided at its bottom with a discharge-opening, *g*, and a curved spout, *c*, which communicates with said discharge-opening, and the mouth of which is on a level, or nearly so, with the upper edge of the discharge-opening, all made together as an integral, and provided with means whereby it can be connected with the body of the cage, substantially as shown and described.

2. A fountain-cup for a bird-cage, the body of said cup being closed at the top and provided at its bottom with a discharge-opening, *g*, which leads into a spout, *c*, the bottom line of the cup and the inner portion of the spout forming an incline, *h h'*, all being made in one piece, and provided with means for connecting it with the body of the cage, substantially as and for the purpose set forth.

3. The combination, with a bird-cage, of the removable fountain-cup B, having the spout *c*, arranged to pass between two adjacent wires of the cage, and the lug *d*, adapted to engage with said wires, substantially as and for the purpose shown and described.

In testimony that I claim the foregoing I have hereunto set my hand and seal this 29th day of March, 1878.

OTTO LINDEMANN. [L. S.]

Witnesses:

J. VAN SANTVOORD,

E. F. KASTENHUBER.